United States Patent [19]
Pavlovic

[11] 3,815,751

[45] June 11, 1974

[54] OIL/WATER SEPARATION AND RECOVERY SYSTEM

[75] Inventor: Jack D. Pavlovic, Oakland, Calif.

[73] Assignee: Pollution Recovery Systems, Oakland, Calif.

[22] Filed: Oct. 6, 1971

[21] Appl. No.: 187,038

[52] U.S. Cl............................ 210/242, 210/DIG. 21
[51] Int. Cl............................................. E02b 15/04
[58] Field of Search................ 210/83, 242, DIG. 21

[56] References Cited
UNITED STATES PATENTS

| | | | |
|---|---|---|---|
| 1,591,024 | 7/1926 | Dodge | 210/242 |
| 2,661,094 | 12/1953 | Stewart | 210/242 |
| 2,876,903 | 3/1959 | Lee | 210/242 |
| 3,630,376 | 12/1971 | Price | 210/242 |
| 3,656,624 | 4/1972 | Walton | 210/242 |

FOREIGN PATENTS OR APPLICATIONS

| | | | |
|---|---|---|---|
| 125,736 | 2/1960 | U.S.S.R. | 210/242 |

*Primary Examiner*—Theodore A. Granger

[57] ABSTRACT

Apparatus is provided for separating fluids of different densities, where the fluids have a substantially continuous common interface. A separating tank is provided having first and second sections, partially separated by a wall extending across the tank and having a height substantially less than the height of the tank, so as to allow communication between the sections. An intake channel directs the flow of fluids downwardly, permitting contact between the lower density fluid flowing in the channel and a layer of the lower density fluid maintained in the tank, so as to capture the major portion of the entering lower density fluid. The higher density fluid plus entrained lower density fluid is directed downwardly into the second section and assumes a tortuous path over the wall into the first section, while the lower density fluid escapes upwards into the layer of the lower density fluid. Means are provided in a lower portion of the first section for continuously removing the fluid of higher density, while means are provided in an upper portion of the tank for continuously removing the fluid of lower density.

In a preferred embodiment the separating tank is mounted in a vessel below fluid level and the intake channel connected to a flexible articulated trough which is controlled to maintain a relatively constant level of fluid, until the fluid reaches the downwardly curving portion of the channel.

Also, a flexible boom is provided for containing the oil or other fluid in anticipation of or during the removal and separation operation.

6 Claims, 14 Drawing Figures

FIG_7

FIG_8

FIG_11

FIG_12

FIG_13

FIG_14

INVENTOR.
JACK D. PAVLOVIC

BY

*Townsend and Townsend*
ATTORNEYS

OIL/WATER SEPARATION AND RECOVERY SYSTEM

BACKGROUND OF THE INVENTION

1. Field of the Invention

The proliferation of offshore platforms in drilling for oil and the great increase in transportation of oil with increasingly larger tankers has created an enhanced threat of oil spillage on the ocean. The devastating effects of oil on wildlife, beaches, and harbors has become only too manifest. In addition, there has been the continuously increasing traffic in harbors, with minor amounts of oil spillage. There is thus, a growing need for satisfactory equipment for rapidly and efficiently being able to isolate the oil from the water and, if possible, recover the oil substantially free of water.

The problem is sufficiently difficult in calm waters, where the water and oil provide a relatively smooth, flat surface. However, on the high seas where wave action occurs, turbulence results in extensive mixing of the oil and water. Since most prior art methods depend upon the oil and water being present in substantially discrete layers, these methods must rely on waiting for calmer seas.

It is also important that separation of the oil and water be rapid. Storing large amounts of oil and water to allow the oil and water to separate makes separation uneconomical.

Finally, it is desirable to have equipment available at all times in reasonable proximity to possible spillage sites, so that the separation can begin immediately or shortly after spillage has occurred. Therefore, in order to be able to bring equipment to the site of the spill, it is desirable that the equipment be air portable. To achieve this, relatively unsophisticated equipment should be employed, which requires minimum maintenance, is reliable, is relatively inexpensive, employs easily replaceable parts, and can be easily assembled and disassembled into its major component parts or sufficiently compact to fit into a large transport plane.

2. Description of the Prior Art

Various methods and apparatuses have been provided for separating and recovering oil from oil spills. U.S. Pat. No. 1,591,024 describes a barge which employs a separating tank. U.S. Pat. No. 2,876,903 employs an adjustable weir, maintains a constant freeboard and a pump for transferring the oil and water into a separating tank. U.S. Pat. No. 3,219,190 minimizes the amount of water introduced into the vessel, concentrating the oil and removing the oil from a collection chamber. Finally, U.S. Pat. No. 3,348,690 employs large booms having openings at one end which produce a vortex as the water and oil flow into the openings, separating the oil and water by centrifugation.

SUMMARY OF THE INVENTION

Apparatus is disclosed for rapidly separating two fluids of different densities, having a substantially continuous interface. A separating tank is provided, partially divided into two sections by a separating wall, which extends upwardly from the bottom portion of the tank, only a portion of the height of the tank, permitting communication between the two sections. A channel, entering at an upper portion of the tank, directs the fluid gently downwardly into one section, through and in contact with a layer of the lower density fluid maintained in an upper portion of the tank, so as to capture the entering lower density fluid. The layer of lower density fluid is supported by the stream of higher density fluid passing through the tank.

The higher density fluid and any entrained lower density fluid flows downwardly and follows a tortuous path over the wall into the second section. The time interval is maintained, so as to permit separation of substantially all of the lower density fluid from a higher density fluid.

The higher density fluid is then removed from a lower portion of the second section by any convenient means, depending on whether the separating tank is moving or stationary. A conduit in an upper portion of the tank extends into the layer of the lower density fluid and is connected to a pump to continuously withdraw the lower density fluid from the tank.

When the tank is mounted on a vessel, for movement through an oil spill, a flexible articulated trough is connected forward of the vessel which is in fluid communicating relationship with the channel. The trough is capable of following the wave form of the water, so as to maintain a substantially constant fluid level with the fluid outside the trough. The tank is mounted for vertical adjustment so that it may be withdrawn completely within the hull of the vessel for rapid movement or lowered, whereby a substantial portion extends below the vessel, when skimming the water for oil. The tank will be substantially cylindrical, and have openings at the bottom and rearwardly to permit discharge of the water as the vessel moves through the water.

An easily constructed flexible boom for retaining an oil spill is provided which is made of inflatable sheeting having three tubes in triangular relation and a curtain suspended from the tubes. The tubes are mildly inflated, so that they may conform to the wave form and maintain a retaining wall around an oil spill.

DESCRIPTION OF THE SPECIFIC EMBODIMENTS

In the subject invention, a method and apparatus are provided for separting fluids of different densities. For purposes of exemplification, the fluids of different densities will be referred to as oil and water. For the most part, these are the fluids of major interest, but many other fluids could be separated in accordance with the subject invention, should the need arise. For example, a major spill of a water immiscible chemical in a harbor or on navigable waters could require rapid removal of the chemical from the water.

In carrying out this invention, a separating zone is provided which is divided into first and second sections. Above a fixed level in the separating zone, the first and second sections are in communication. Water and oil having a substantially smooth continuous interface are channelled from above into the separating zone with a minimum of turbulence and urged downwardly, passing through a layer of oil. A major portion of the oil passing through the oil layer is captured by the oil layer, with a minor portion of the oil entrained with the water and continuing through the oil layer downwardly.

The water flows downwardly past the barrier between the two sections and then upwardly over the barrier and then again downwardly into a discharging zone communicating with the second section. The time for the tortuous path is such, that a major portion of the oil which has been entrained with the water is able to separate and flow upwardly to join the oil layer. The oil in the upper layer is continuously removed so as to maintain a relatively stable depth. Sufficient water is retained in the discharge section to prevent the oil from discharging from the discharging zone.

Figure 3:
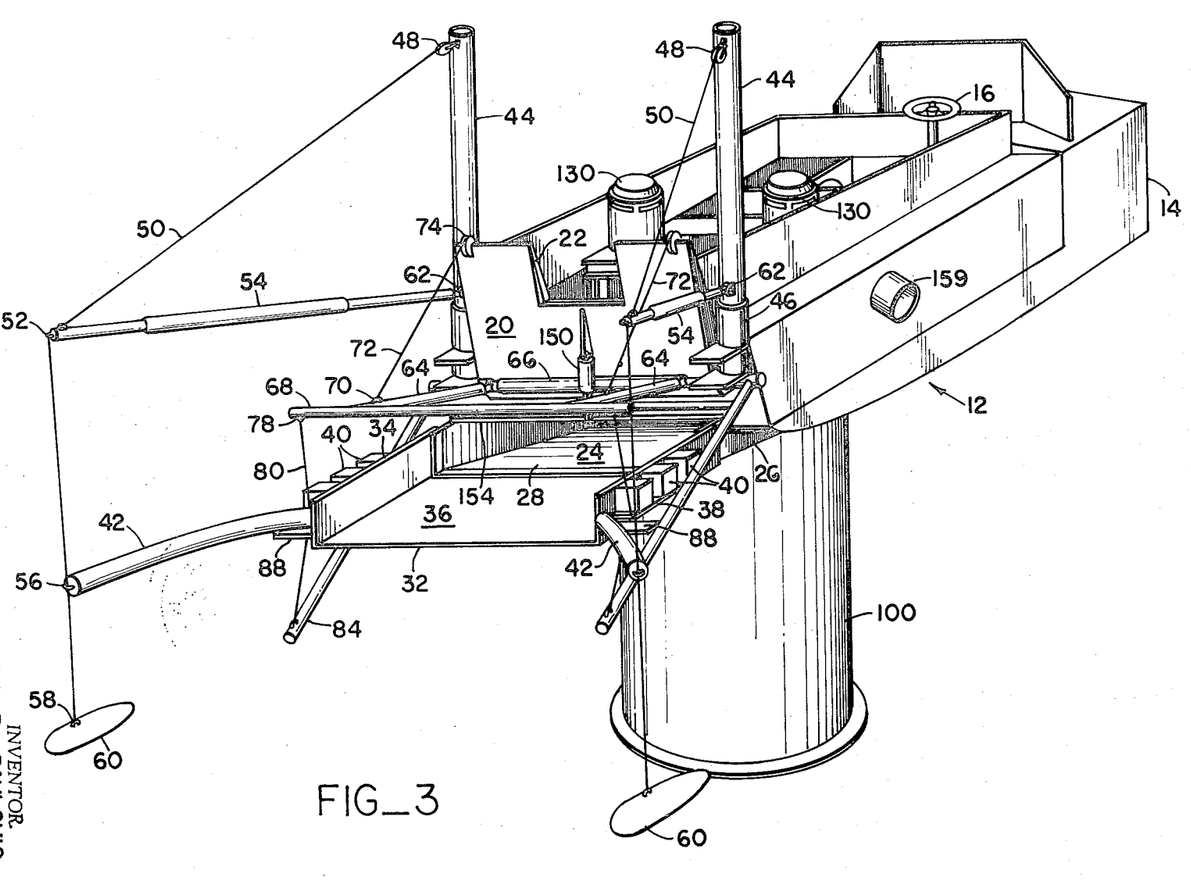
FIG. 3 is a perspective view of the vessel depicted in FIG. 1.

Turning now to a consideration of the drawings, for more detail and understanding of the method and apparatus of this invention. In FIG. 3 is a perspective view of a vessel 12 in conformation for skimming oil from water. While the vessel depicted in the drawing is based on a modified LCVP, other vessels could also be used as appropriate in the method of this invention. An LCM, a catamaran or two pontoons with the appropriate equipment and supporting members would also suffice. Any vessel which permits an open bow and a means for supporting the various elements employed in skimming and separating the oil, can be used advantageously. Therefore, in describing the subject invention and employing an LCVP, it is intended that the LCVP be merely exemplary.

The vessel has a hull structure 14, a steering wheel 16 for controlling the direction of movement and a motor 18 for driving a screw, not shown.

Figure 1:
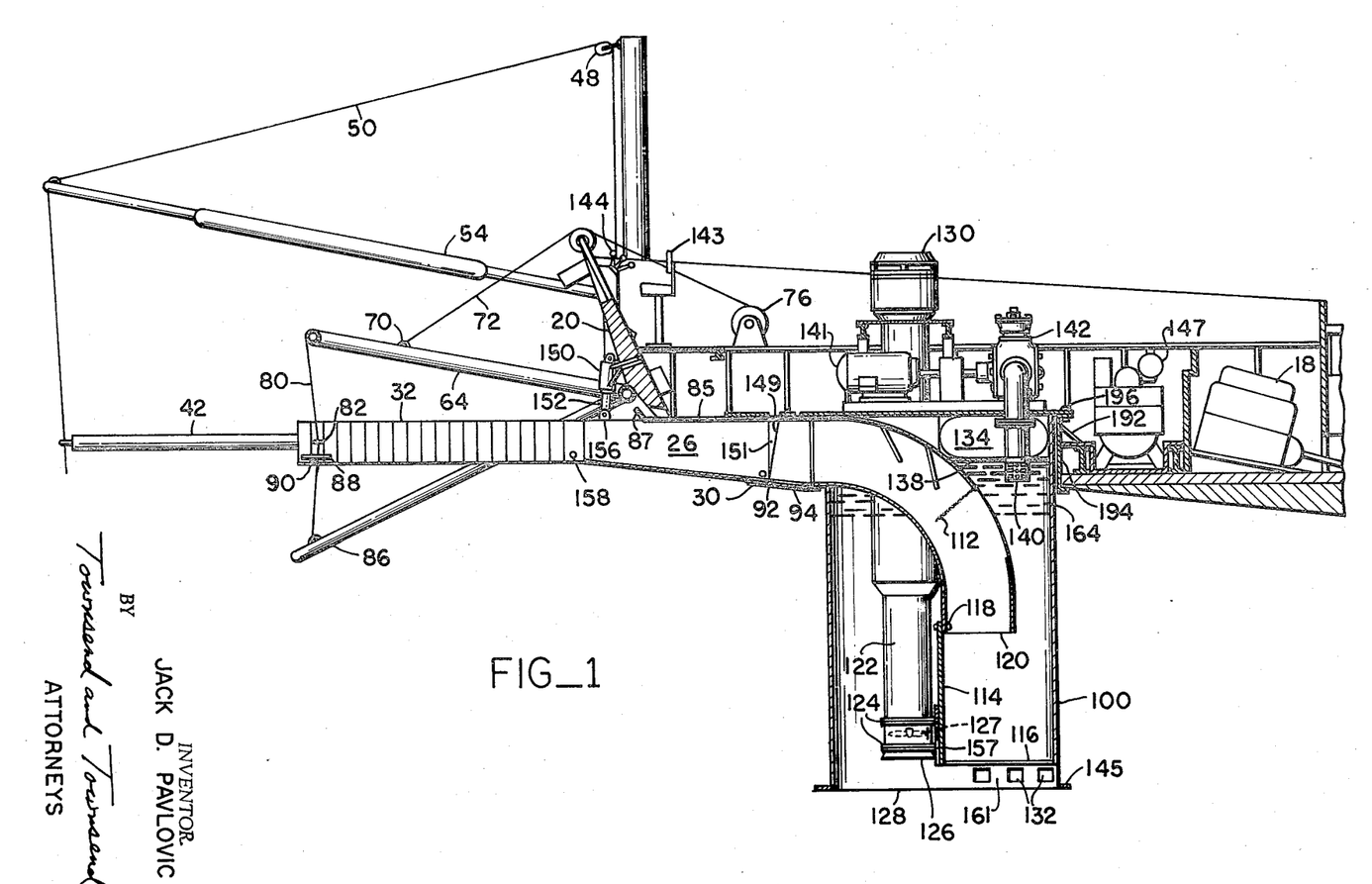
FIG. 1 is a longitudinal vertical section of the vessel partially in section with the tank lowered for operation.
Figure 2:
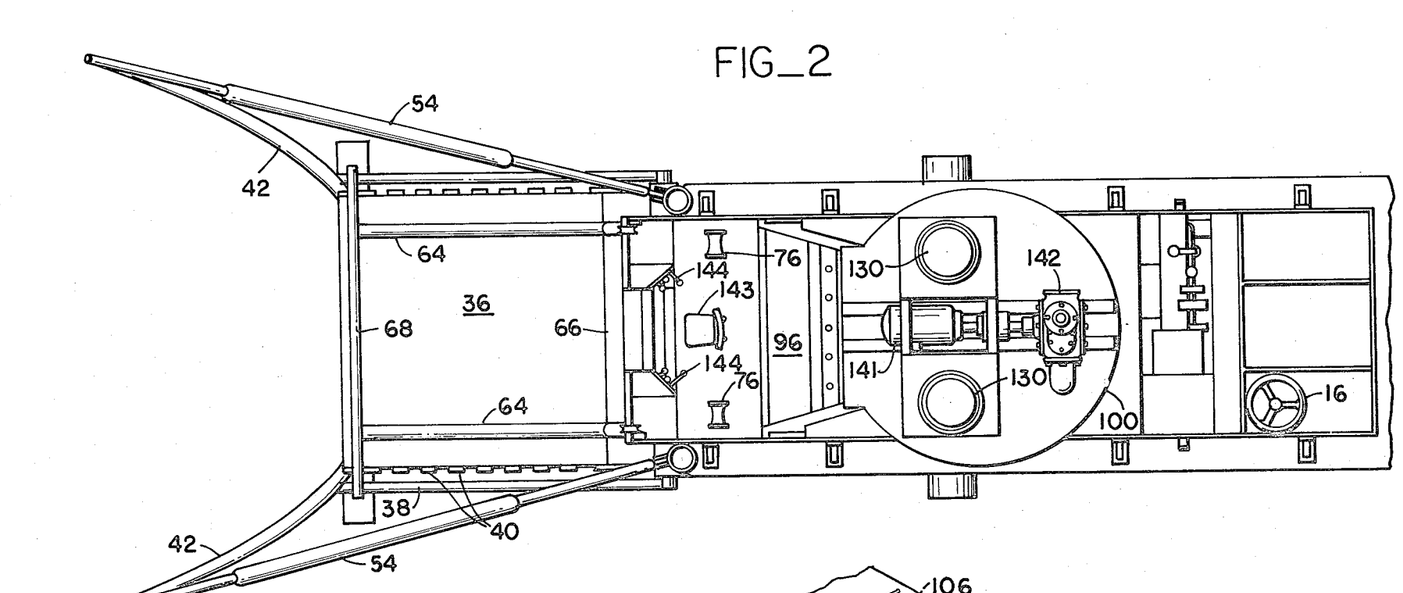
FIG. 2 is a plan view of the vessel depicted in FIG. 1.

When the vessel is being used for skimming oil from water, it will be in the configuration as depicted in FIGS. 1, 2 and 3. The bow 20 of the LCVP will have a window area 22 cut out for observing the operation of the skimming device and a large opening provided for channel 24. Because of the configuration of the LCVP, the channel 24 will incline rearwardly and downwardly for purposes which will be discussed subsequently. The channel 24 will have two side plates 26 and an under plate 28, joining the side plates to form the channel 24. The rearward end of the under plate 28 is bolted to a hinge leaf 30 which runs the full length of the under plate 28 to permit raising and lowering of the channel 24. This also provides the capability for varying the height of the layer of water which enters the channel 24.

The channel 24 is coaxially joined to a flexible trough 32, with the trough 32 having its sides 34 outside of and partially overlapping the channel sides 26. This provides a wider trough to accumulate more oil and water for separation. The sides 34 are substantially parallel, maintaining a constant cross section of the trough.

The trough is articulated, so as to be able to follow the wave patterns of the water, at a fixed depth under the oil-water interface. Therefore, as the trough moves through the water, the water and oil will not be disturbed, but will be able to follow their normal wave motion until entering the channel 24. Thus, the oil and water are confined by the trough, rather than being forced into the trough.

A flexible trough can be achieved by employing alternating rigid strips, e.g. metal or plastic, and flexible strips, e.g. rubber, which are joined to form a substantially smooth trough floor 36. The sides 34 are formed in the same manner, so that the entire trough can curve easily to form a wave form. The strips forming the floor 36 extend beyond the sides 34 to form platforms 38 which support floats 40. The floats provide enhanced buoyancy to the trough, as required, depending upon the materials employed for the strips. In this way, the trough is capable of floating in the water.

Conveniently, the trough may be made of relatively thin alternating strips of steel, metal alloy, or plastic sheeting with rubber sheeting, which are adhered together to form a continuous channel. The rubber sheeting will be sufficiently flexible so as to bend and, since it carries little weight, may be a relatively thin membrane. Similarly, the rigid sheeting can also be extremely lightweight, having sufficient strength to withstand normal treatment or impact of debris which might be encountered during use.

Figure 11:
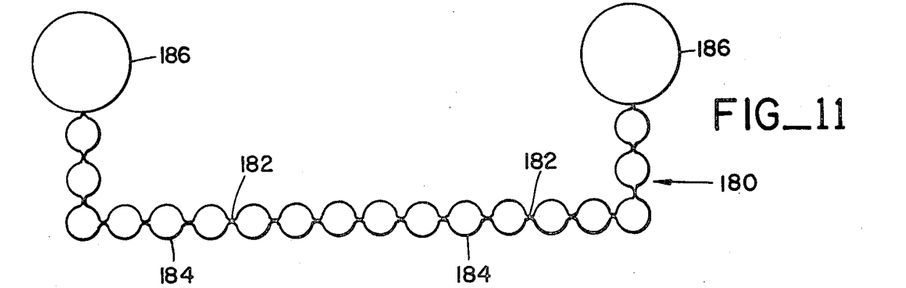
FIG. 11 is a cross-sectional view of an embodiment of an articulated trough.

An alternative trough 180 as depicted in FIG. 11, could be made from two heavy sheets of heat sealable plastic. The two sheets would be heat sealed along seams 182, so as to form a plurality of tubes 184 extending in the direction of flow of liquid through the trough. To enhance buoyancy two large tubes 186 are provided at the top of the sides of the trough 180, which are inflated with air. The small tubes 184 would be filled with fluid approximating the density of the oil. The trough when passing through the water, would be weightless, being supported by the water.

In order to protect the plastic sheets from puncture, a hard plastic or metal leading edge would be sealed onto the front of the trough. The leading edge is constructed of alternating inner 188 and outer sections 189, partially overlapping, and connected by pins 190 passing through a slot in the outer section 189 and rigidly bonded to the inner section 189. In this manner, the trough is capable of adapting to a wave form, both in the direction of movement and the transverse direction, with the leading edge being sufficiently flexible to assume a wave form in the transverse direction.

Figures 12, 13, 14:
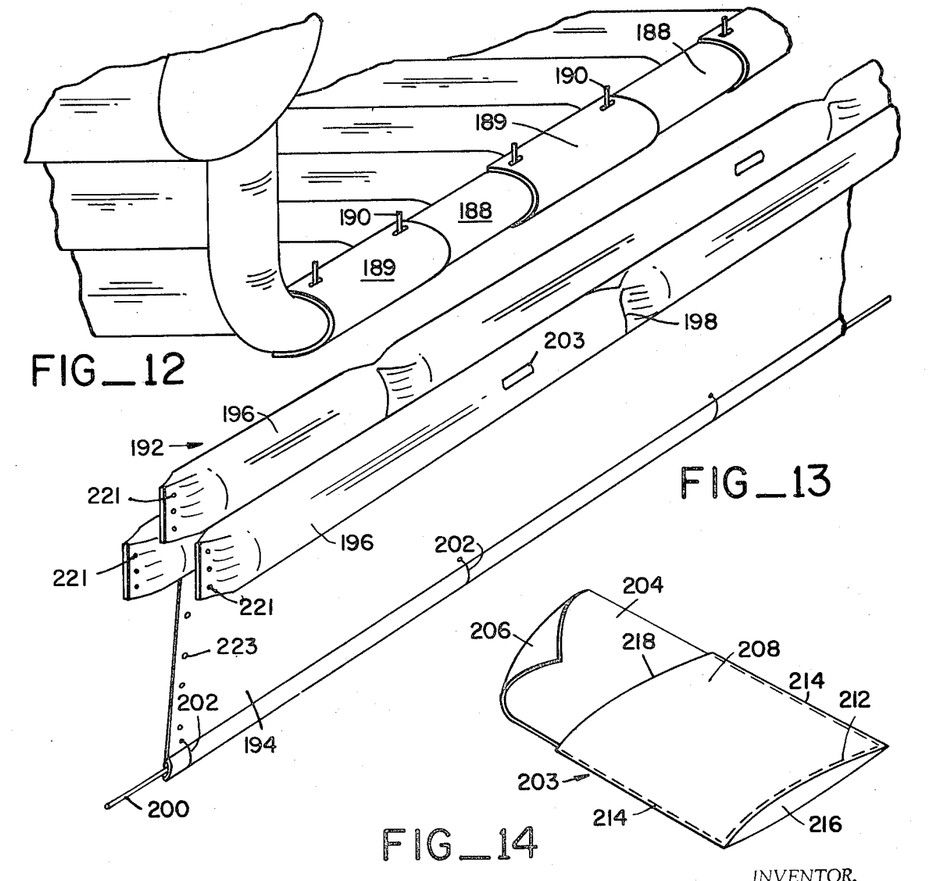
FIG. 12 is a perspective view of a protecting forward edge for the trough depicted in FIG. 11.
FIG. 13 is a perspective view of an inflatable floating boom.
FIG. 14 is a perspective view of a valve for inflating the sections of the boom.

While the leading edge may be constructed of flat rectangular plates, having a height dimension equal to the thickness of the trough, preferably the leading edge has a parabolic cross-section as depicted in FIG. 12. The parabolic form provides for a smoother movement through the water.

If a smooth trough surface is desired, a third sheet of plastic may be used to cover the floor and inner sides of the trough.

Extending forwardly from the two sides 34 of the trough are flexible arms 42 which are disconnectably linked to the trough sides 34 by any convenient means which permits the arms to pivot. The arms may be of any convenient dimension and are made of a lightweight flexible material which is capable of bending to follow the wave form of the water. Conveniently, a strong durable hose, such as cargo hose, is employed, having an 8 to 12 inch diameter. The hose is filled with air and sealed to provide buoyancy. The flexible arms 42 serve as gathering arms to enhance the amount of oil which is directed toward the trough 32.

In order to maintain the trough 32 and flexible arms extended and, as will be discussed subsequently, to raise the trough out of the way when not in use, a plurality of booms and blocks are employed. Two king posts 44 are provided, forward of the hull 14, which are journalled in casings 46. Mounted at the top of the posts 44 are pulleys 48 through which lines 50 run. Lines 50 extend through eyes 52 at the end of booms 54. The lines continue downwardly through eyes 56 at the ends of arms 42 and terminate with rings 58 fastened to paravanes 60. The paravanes serve to hold lines 50 taut and maintain arms 42 extended outwardly at a relatively fixed separation from each other. The other ends of lines 50 are connected to winches, not shown. The booms 54 are mounted on the king posts 44 by padeye connectors 62.

To maintain the trough 36 extended and for lifting the trough, a hoist is provided having cantilevered arms 64 extending over the trough 32 which are pivotally mounted at one end on the supporting shaft 66 with the other end rigidly connected to cross arm 68. Cross arm 68 extends beyond the jointures with arms 64. The arms 64 have eyes 70 to which lines 72 connect, the lines running over sheaves 74 to winches 76. By winding lines 72 on winches, the arms 64 may be raised.

Mounted near the ends of cross arm 68 are rings 78 from which chains 80 extend downwardly through eyes 82 which are mounted on the trough sides 34. The chains 80 terminate in connection with rings 84, which are bolted to lower arms 86. The lower arms 86 are pivotally mounted on shaft 66 outwardly of cantilever arms 64, so as to be outside of the trough 32. The chain rides loosely through eye 82 permitting the weight of the lower arms 86 to maintain the chain in tension. The ends of the lower arms 86 ride below the surface of the water. The resulting drag on the lower arms 86 as the arms move through the water maintains chains 80 under tension keeping the trough 32 extended. However, the flexible nature of the trough and the rotatable freedom of the arms associated with the trough, permit the trough to form an undulating shape.

Figures 4, 6:
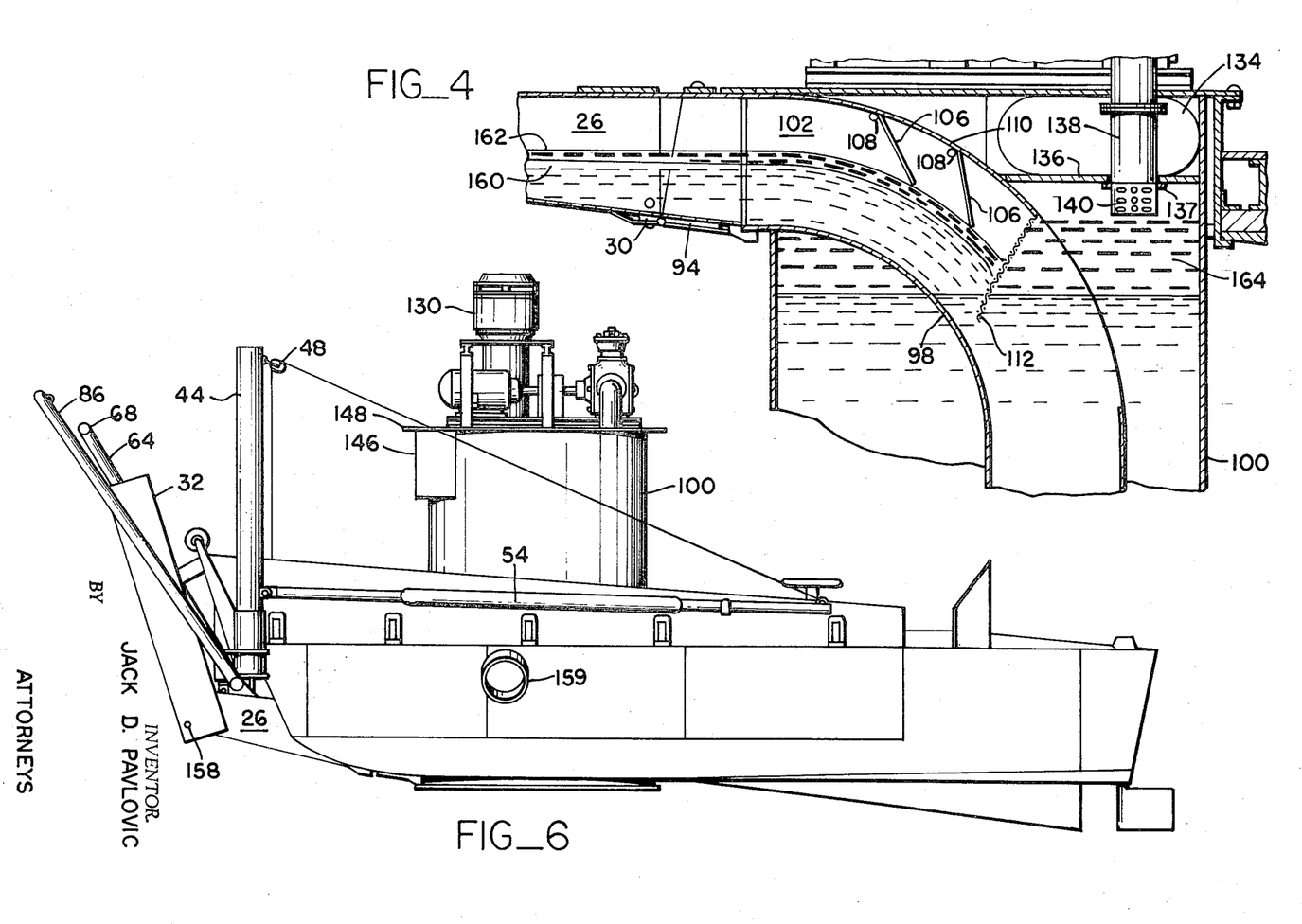
FIG. 4 is an enlarged, detailed sectional view of a portion of the intake system and tank.
FIG. 6 is a side elevation of the vessel with the tank and trough raised, when the separating system is not in operation.
Figure 5:
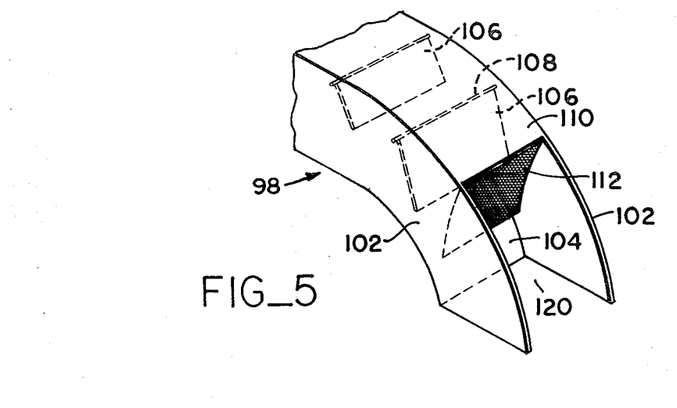
FIG. 5 is a perspective view of a portion of the intake system.
Figure 7:
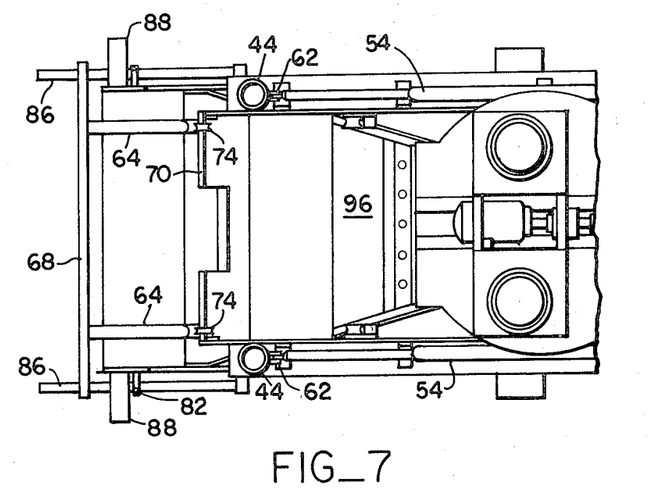
FIG. 7 is a plan view of the forward portion of the vessel, with the vessel in the configuration as depicted in FIG. 6.

When the cantilevered arms 84 are raised, the chain 80 will pull up the lower arms 86 and the trough 32. To bring the trough 32 and lower arms 86 into a completely raised position as depicted in FIG. 6, means can be provided for pulling on the chain 80 or the lower arms 86. Alternatively, a hydraulic system may be employed for raising the lower arms and trough into the raised position, during rapid movement of the vessel.

The trough floor 36 is intended to ride beneath the interface of the water and oil, so as to maintain a relatively constant flow of water into the trough. In order to control the level at which the trough floor 36 remains below the oil-water interface, vanes 88 are pivotally mounted on pins 90 which extend from the trough sides 34. By employing depth sensing devices, not shown, the angle of the vanes can be adjusted so as to control the depth at which the trough moves through the water. Also, the level of the channel 26 will effect the level of water entering the trough.

A flexible rubber cover 85 prevents oil and water from slopping out of the channel 26 into the vessel. A deflector 87 forward of the cover 85 prevents a sudden surge of oil from entering the vessel by coming in over the cover 85.

Having described the trough and channel, the remainder of the structure concerned with the separation of the water and oil will now be considered. The channel under plate 28 which is bolted to hinge leaf 30 is connected by hinge pin 92 to hinge leaf 94. The hinge leaf 94 is in turn rigidly bolted to a portion of the hull 14, which serves as a connecting channel 96. The connecting channel 96 discharges into a flume 98.

The flume 98 extends from the connecting channel 96 downwardly into a cylindrical separating tank 100. The flume 98 is conveniently constructed with flat sides 102 normal to a flat bottom 104. Interior of the flume are swash plates 106 which are rotably mounted on pins 108 in flume sides 102, so as to ride freely on the surface of the oil pouring through the flume. The swash plates 106 serve to slow the flow of oil relative to the water and to smooth the oil surface. Alternatively, flexible swash plates could be used which are rigidly mounted to the flume and bend with the flow of oil, riding on the surface of the oil. The flume is enclosed for a portion of its length by a cover 110, the cover terminating where a mesh screen 112 extends across the flume. The function of the mesh screen and the opening of the flume will be discussed subsequently. The opening at the top begins at about the middle of the arc downward.

Extending across the separating tank 100 is a baffle plate 114, being transverse to the hull of the vessel 12 and along a diameter of the separating tank 100. The baffle plate 114 is mounted on platform 116 which covers only approximately half the floor area of the separating tank 100. The flume 98 extends downwardly and sidewardly and is bolted by bolt 118 to the baffle plate 114 to provide rigid support. The termination 120 of the flume is a little below the top of the baffle plate 114. The baffle plate 114 divides the separating tank 100 into approximately two equal semicylindrical sections which communicate above the top of the baffle plate. The sections serve as an intake section and a discharge section. The baffle plate 114 will extend for about from one-third to about one-half the height of the separating tank 100.

On the opposite side of the baffle plate from the flume are pump ducts 122, symmetrically situated so that only one can be seen in FIG. 1. The pump ducts 122 have flanges 124 which act to support the propeller shaft of the pump, which extends the length of the pump duct 122. The openings 126 of the ducts approach the floor 128 of separating tank 100. Mounted in the ducts 122 near the openings 126 are propellor pumps 127, shown in phantom, which are powered by motors 130. Various types of pumps may be used, conveniently a propeller pump such as a Jacuzzi or agricultural lift pump may be employed. The capacity of the pump will vary with the size of the separating tank and the amount of water which must be handled in accordance with the separation of the oil and water.

Openings 132 are provided in the area between the floor 128 and the platform 126, the openings being at or behind the ends of the diameter normal to the direction of motion. The openings 132 discharge sidewardly and rearwardly near the floor 128 of the separating tank.

Attached to the roof 148 of the separating tank toward the rear is a flexible bladder 134. Affixed to the flexible bladder 134 opposite and parallel to the roof 148 is a plate 136, which acts to smooth out the oil layer upon which it rides. The bladder 134 acts to fill the dead space to minimize oil splashing up and apply a mild pressure to the oil. The plate 136 is prevented from descending beyond a fixed position by stops 137.

Extending downwardly into the separating tank is duct 138 which has a plurality of orifices 140 near the end. The duct 138 is connected to a pump 142, powered by electric motor 141. The pump serves to pull the oil out of the separating tank at a continuous rate, so as to maintain a relatively even oil level. Various pumps may be used for removing the oil, for example positive displacement vane pumps, such as Blackmer pumps, which can withdraw viscous oil at a rapid rate, as required.

The electric power for the water pumps motors 130 and the oil pump motor 140 is provided by diesel motor 147 mounted aft of the cylindrical tank 100.

Having considered the individual parts, the employment of the subject apparatus will now be considered. An operator sits in seat 143 and operates control panel 144. The operator can see through window 22, so as to watch the operation of the trough 32 and control the movement of the various booms and arms. The operator can control the raising and lowering of the trough 32 as required for operation or rapid movement when not in operation. Controls are also provided for operating the various pumps, as required.

In order to permit rapid movement for the vessel 12, the separating tank and trough are made retractible, so as to reduce the drag on the vessel. The means for raising the separating tank can be any convenient hydraulic or gear means for raising the separating tank from its lowered position to its raised position, whereby the hoop 145 about the floor 128 of the separating tank 100 conforms substantially to the bottom of the vessel, to maintain a smooth profile on the hull bottom. The opening 146 to the channel 96 in the separating tank 100, as well as the top 148 of the separating tank, which serves as a platform for the pumps, are raised above the sides of the vessel 12.

The boom 54 is turned about 180° so as to be alongside the vessel 12, by turning the king post 44. By retracting lines 72, the arms 64 and 86 are raised, and the trough 32 is drawn upwardly out of the water. A hydraulic cylinder 150 with associated piston rod 152 is pivotally connected at one end to the bow 20 and at the other end to a bar 154. The bar 154 is journalled at its end in flanges 156, which are welded to the sides 26 of the channel 24. By means of the hydraulic piston, the channel 24 may be raised up, so that its leading edge is out of the water. The edges 149 of the channel 96 are inclined so as to leave a space 151 to accomodate the channel sides 26. A plate, not shown, is fitted adjacent the sides of the channel, to enclose the openings 151.

The fate of the flexible arms 42 and paravanes 60 is not shown, but these would be drawn backward with the boom 54 and could be disconnected and taken inboard. Pins 158 are mounted inwardly of the trough sides 34 and journalled in channel sides 26, so the trough 32 rotates about the pins, when raised or lowered.

Once the vessel 12 has arrived at the site for separation of oil and water, the separating tank 100 is lowered. Stanchions 192 support bracket 194. The top 148 of the tank 100 extends over the bracket 194 and is bolted by means of bolts 196 to ensure that the tank is rigidly held in position during movement of the vessel. The king posts 44 are rotated to bring booms 54 into position with the associated flexible arms 42 and paravanes 60, while arms 64 and 86 are lowered to lower the trough 32 into operating position. Similarly, the hydraulic piston rod 152 is extended so as to lower the channel 24 to provide the pathway for the oil and water.

Figure 8:
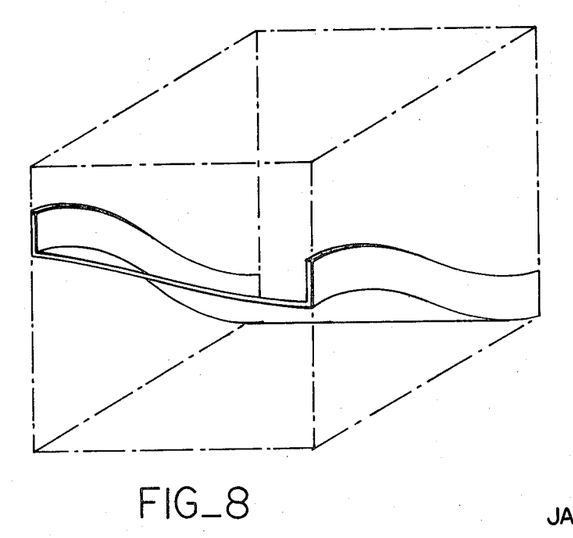
FIG. 8 is a diagrammatic view of the wave form of the trough.

As already indicated, it is intended that the level of oil confined in the trough remain relatively constant in relationship to the level of oil outside the trough. The type of form which the trough can assume is depicted in FIG. 8 which shows the sinusoidal type of wave form which trough 32 can assume. The trough will normally extend for a distance approximating the distance from the wave peak to the wave trough. The trough can easily move through the waves, describing a relatively uniform path.

Since the trough is wider than the width of the inboard of the vessel, as the width of the cross section of the channel narrows, it is necessary to lower the channel so as to maintain a constant oil level, with the water level dropping. This provides for the natural flow of water through the entry as the vessel moves through the water.

The amount of fluid introduced into the separation tank will be a function of the cross-sectional area of the trough, the depth at which the floor of the trough moves through the water, and the rate at which the vessel moves through the water. Usually the rate will be relatively slow, generally being about 5 knots. The speed at which the vessel moves, also functions to control the hydraulic head which is maintained. At 5 knots a differential of about 2.5 feet is maintained, which is found to be satisfactory for an efficient flow of water and oil into the separating tank.

The amount of water taken in will normally be greater than the amount of oil, usually twice the volume and may be as high as ten times, usually of the order of three to eight times. However, little if any water need be drawn in, since some water will always be retained at the bottom preventing discharge of the oil through the rear openings.

In order to start the flow, the water pump motors 130 are started activating the pumps 127, so as to provide the desired 2.5 feet differential. A plate 157 is lowered to close the discharge chamber 161. The water is discharged out of pipes 159 above the water level. When equilibrium has been achieved, and water is being removed at the same rate it is being introduced, as well as an oil layer having been formed, the vessel can begin to move. The oil and water will now flow through the trough 32 and through the channels 24 and 96. As the channel narrows and lowers, the water level 160 will drop, in relation to the water level outside, while the oil level 162 will remain substantially constant, the depth of the oil level increasing.

The water and oil will then enter the flume 98 to begin a rapid descent. The swash plates 106 will ride on the surface of the oil and maintain a relatively smooth surface. The swash plates may be made of any convenient lightweight material, such as an inert plastic or low density metal, so as to be capable of riding on the surface of the oil and smoothing the surface as the oil descends in the flume. The flume is partially enclosed to contain the oil in the flume.

As the water and oil descend through the flume, the water and oil will pass through a mesh screen 112. The mesh screen is of moderate thickness, less than an inch, and extends downwardly into the water layer. The screen is flexible enough to bend with the flow of water and oil and slow the flow of oil. The flow rate should not be too greatly diminished and the mesh size can be relatively large. Any wide mesh screen of an inert material may be employed. Conveniently, Vexar, having a mesh of about 5 pores per linear inch may be used.

The mesh is rigidly affixed to the flume at the top portion of the sides of the flume and partially moves out of the way of the flow of the water by bowing.

The screen is open to the layer of oil 164 which is maintained in the separating tank at a level which maintains the screen coated with oil. As the entering oil passes through the screen 112 and the oil layer 164, the surface tension of the oil will serve to capture the entering oil in the oil layer 164, so as to minimize the amount of oil which descends below the oil layer 164. Therefore, only a relatively small percentage of the oil which is taken into the separating tank remains with the water past the oil layer 164.

The velocity of the water and pressure differential will cause the water to descend downwardly toward the platform 116. The water will then describe a tortuous path coming up and going over the baffle plate 114 into the other section of the separating tank. While initially the water pumps will remove the water, discharge of the water will now be dependent upon outlets 132 provided for in the rear portion of the separating tank. The plate 157 will be raised at the same time that the pumps 130 are stopped.

Because of the circular nature of the separating tank 100, the movement of the tank through the water provides a pressure differential, which serves to aid the discharge of water into the surrounding body of water. The oil layer 164 is withdrawn up through orifices 140 by the pump 142. The oil is maintained as a relatively flat smooth surface about the orifices by the plate 136, which rides on the oil surface. In this manner, the effect of the movement of the vessel on the surface of the oil is minimized and turbulence avoided. The oil pump is connected by convenient conduit means to an oil storage container towed astern, such as a rubber tube container. The container, when filled, may be jettisoned to be picked up as convenient by a towing vessel. Alternatively, tankers or other storage vessels may be employed for the storage of the oil as collected by the skimming vessel 12.

If desired, a venturi may be used which is installed at the bottom of the separating tank on the floor 128. As the vessel 12 moves through the water, the venturi will act to provide the necessary hydraulic differential and withdraw the water, discharging the water rearwardly in the same manner as achieved with the apertures 132.

An exemplary vessel could be built from available LCVP's which are about 50–75 feet long. A separating tank would be employed having about a 10 foot diameter which would fit conveniently within the hull of the vessel. The separating tank would have a total height of about 17 feet, extending about 14 feet below the bottom of the vessel. The baffle plate would be mounted on a platform about one foot above the floor of the separating tank, and be about 7 feet high.

A conveneint trough size would be about 17 feet long and about 10 to 30 feet wide having sides about 1½ to 3 feet in height. The strips would be about one foot in width while the small tubes would be about three inches in diameter.

Figures 9, 10:
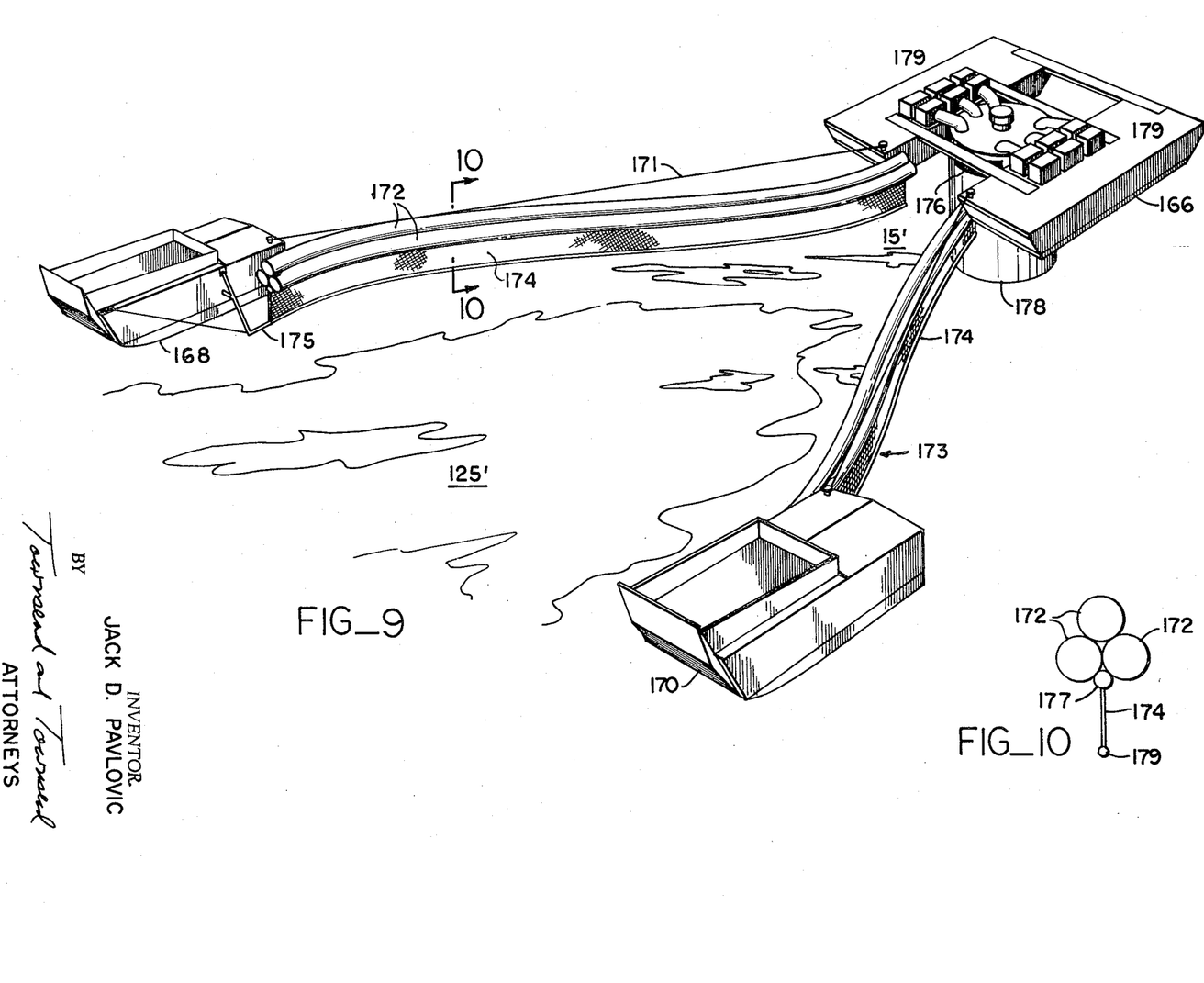
FIG. 9 is an alternate embodiment of an oil skimmer vessel, for use with large volumes of oil.
FIG. 10 is a cross-sectional view taken along the line 10—10 of FIG. 9.

While the dimensions of the above vessel would be satisfactory in harbors and for reasonably large spills, for very large amounts of oil, the vessel diagrammatically depicted in FIG. 9 would be useful. The separation and storage vessel 166 would have two tugs 168 and 170 or other vessels for pulling the storage vessel. The tugs 168 and 170 pull the storage vessel 166 by means of cables 171. Flexible booms 173 are connected to the tugs 168 and 170 by means of mounts 175 and extend and are connected to the storage vessel 166 by means not shown. The booms have three inflated tubes 172 which are depicted in greater detail in FIG. 10.

The tubes are inflated to provide buoyancy. The three tubes 172 can be made of heavy plastic sheeting and are joined by heat sealing or other means, so that their axes define an equilateral triangle. The bottom two tubes are mounted on a heavy durable hose, 177, such as cargo hose, to provide strength. The tubes are fully inflated to provide a retaining wall to enclose the oil. Depending from the hose 177 is a plastic sheet 174, which acts as a wall to contain the oil and direct the oil toward the vessel 166. Cables, are attached to the bottoms of the plastic sheets 174, to maintain the sheet extending downwardly and to control the sheets for withdrawal and release. The booms 173 are longer than the cables 171, so that as the vessels move, the drag on the booms will make the booms bow out, enlarging the enclosed area within the booms 173.

The oil and any water is directed toward the opening 176 in the separating tank 178, which would be constructed in the same manner as the separating tank 100. A plurality of pumps 179 are provided for rapid removal of the oil from the separating tank 178 and storage of the oil in the vessel 166. The intension is that large amounts of oil would be skimmed without too much concern for efficient separation. In this manner very large amounts of oil could be rapidly retrieved before the oil began to spread. It is envisioned that oil layers of two to three inches would be encountered, which would grow to many inches in height by the time the oil layer entered the tank opening 176. After the gross amounts of oil have been retrieved, a smaller vessel could be employed for retrieveing the remaining oil.

In conjunction with the vessels of this invention, flexible oil booms can be used to contain the oil until the vessel arrives and/or hold the oil, while the oil is being retrieved The flexible oil boom is depicted in FIG. 13.

The booms are constructed of relatively thin sheets of film. Tubes of sheet film can be employed, which are extruded as such or a single sheet may be employed and used to form the tubes as a single structure.

In making the boom 192 from existent tubes the four tubes are laid flat one on top of the other. A common edge of the four tubes is heat sealed to the adjacent tube(s). Linear parallel seams are formed which may be contiguous, so as to form almost a single joint or adjacent, so as to form four narrowly spaced apart seams. Depending on the method of affixing ballast to one of the tubes, one of the tubes which is attached to only one other tube may be slit along its full length to provide a double sheeted curtain 194 having free depending ends.

If desired, the curtain may be heat sealed to the most distant tube, so that the curtain is joined to the first and third tubes, providing a symmetrical arrangement.

The ends of the three tubes 196, which provide the buoyancy, are then sealed and the tubes pinch sealed at regular intervals in a staggered relationship.

The pinch seals are staggered at one-third the length of the sections. In this way, the pinch seal in the second tube is one-third the length of the section from the pinch seal in the first tube. The pinch seal in the third tube is one-third the length of the section from the pinch seal in the second tube and two-thirds the length of the section, from the pinch seal in the first tube. Thus looking along the length of the three tubes, there would be one pinch seal every one-third length of section.

The three tubes 196 and curtains 194 can also be made from a single sheet. The sheet is divided into four equal parts and folded, alternating along the seams and midway between the seams, so as to have a layer of eight plies high, with the two long edges of the sheet on the same sides. By heat sealing the two edges and the seams together on one side, four closed tubes will be formed. One of the tubes may be slit to provide the curtain. The final structure is substantially the same as that obtained with the preformed tubes.

Alternatively, the sheet may be divided so as to have an accordion pleating of only seven plies, with the edges of the sheet on opposite ends. In this manner, a curtain is provided having a single, rather than a double, sheet.

The method of constructing the tubes is not critical to the invention. Rather, the flexible boom is concerned with three tubes of a lightweight, flexible, substantially non-elastic thin film, capable of inflation. The tubes may have their seams to adjacent tubes in such close proximity as to have a single sheet joint or, when prepared from the single sheet, a narrow strip or inch may be present between the tubes, ordinarily not exceeding about one inch in width. The construction has two tubes substantially parallel in the horizontal plane, supporting a third tube above, to form a containing wall, with a curtain extending downwardly.

In order to maintain the curtain in an extended position when in use and for recovering and paying out the boom, a ballast is secured to a bottom portion of the curtain. A preferred form of ballast is continuous flexible ballast, such as a cable, used by itself or in conjunction with other ballast. Various ways can be employed for securing the cable to the curtain. For example, one of the sheets that forms the curtain can be turned up around the cable and heat sealed to form a channel for the cable. The other sheet may then be fastened to the cable holding sheet at fixed intervals. This prevents the collection of water between the two sheets.

Rather than heat sealing, snap tabs could be used at intervals. The end of one sheet of the curtain would be turned up to provide a channel for the cable and the tab extend through the two sheets, holding the two sheets together.

While the tube forming the curtain could be left un-slit and the cable passed through the tube, it is found that water will accumulate in the tube forming the curtain. Openings could be provided at recurring intervals to allow the water to drain out. However, these openings could be sites for initiating tears and should, therefore, be reinforced.

To provide further support for the cable and additional weight to maintain the curtain in its extended position, weights can be attached to the cable. Gilnet weights are particularly useful in having a doughnut shape and dividing into two equal parts. The two parts are clamped together over the cable and plastic film to provide additional coupling of the cable and curtain. The cable and surrounding film are held firmly together in the opening of the gilnet weight. These weights can be rapidly clamped onto the cable as the boom is being payed out and inflated and removed from the cable as the boom is retrieved and deflated. Other types of weights may also be used to advantage, as required, for maintaining the curtain completely extended downwardly and providing a rigid retaining wall for the oil.

The amount of weight employed and the intervals at which the weights are affixed will vary with the thickness of the film, the size and weight of the cable, etc. The weights will generally vary from 1 to 10 pounds and be affixed at intervals of about 5 to 25 feet.

A valve is provided for inflating each section. Any valve may be used which can be conveniently installed in the tube. The valve should provide for rapid and convenient opening and sealing with easy introduction of air. An exemplary valve 203 as depicted in FIG. 14 could be made of three sheets of plastic: two sheets 204 and 206 of the same dimensions and one shorter sheet 208, having the same width as the other two sheets.

A slit is made in the tube 196 having a length equal to the width of the valve sheets. One end 212 and the two sides 214 of the short sheet 208 are sealed to the complementary end and sides of a long sheet 204 to form a pocket. The two long sheets 204 and 206 are sealed along their side edges 214 to form a channel 216. The three sheets are then inserted into the slit 210 in the tube 196. The top edge 218 of the short sheet 208 is sealed to one edge of the slit 210 and the outer long sheet 206 is sealed to the other edge of the slit intermediate the ends of the long sheet 206.

The tube 196 may now be inflated through the channel 216 formed by the two long sheets 204 and 206. The portion of the long sheets extending outside the slit may be folded over and tucked into the pocket to close the valve. The exposed portion of the folded sheet is clamped to prevent their unrolling. This operation may be carried out rapidly and efficiently. The valve does not add any significant bulk to the tubes, so as to affect the substantially uniform thickness of the boom when folded.

Since the length of any one section of the boom is limited for construction, handling and replacement, the ends of a section are provided with means for connecting with another section. At the end of each section of the boom, the tubes 196 and curtain 194 are provided with a plurality of snaps 221 or other convenient fastener. If desired, the end portions of each of the tubes are flattened for a convenient distance, by sealing the two walls together in the vertical direction. This provides flat flaps 222 which may be overlapped and fastened together. The curtain is also provided with fasteners 223, whereby the three tubes and the curtain of each boom section overlap in complementary fashion and are linked together. A small portion of the cable 200, about the length of the flap, is exposed. When the flaps are fastened, the cables will overlap side by side and can be secured together with a toggle clamp. In this manner, each boom section is securely fastened to the next section, providing a substantially continuous retaining wall.

The construction of the flexible boom permits the deflated boom to be rolled on a spool for easy paying out and retrieval. As the boom is retrieved the cable is wound on a spool a prescribed number of turns for each layer. The deflated tubes are laid superimposed on one another, next to and not overlapping the cable. The length of the spool is equal to the length of a tube plus the length of the curtain, when extended. Beginning with the cable adjacent one wall of the spool, each turn of the cable brings the cable closer to the center of the spool. To accomodate the shorter distance between the cable and the other end of the spool, the curtain is folded over a sufficient distance to form an edge of double thickness which is adjacent to the end of the spool distant from the cable and which is coaxial with the outer edges of the tubes.

To illustrate, a spool is provided having a three foot diameter drum and sides extending outwardly six inches from the drum, with 4.7 feet between the sides. The boom is 500 feet long. The cable employed is 0.5 inch in diameter. The film used for the tubes and curtain is 0.01 inches thick and the first layer would have eight turns of cable, each layer having about the same number of turns, about seven layers being required. Each tube when deflated will be 2.8 feet wide and the curtain about 1.8 feet wide. The eight turns of cable will require about four inches for the cable, the remainder of the space on the spool accomodating the tubes and curtain. With the above dimensions, a relatively uniform layering of the cables and tubes is achieved, allowing for easy rolling up and release of the boom.

In fabricating the boom, various films can be employed having the desired tensile strength and flexibility. Polyethylene, polypropylene, etc. may be used, with polyethylene preferred. The film thickness will be at least 0.005 inches and not more than about 0.015 inches, usually from about 0.006 to about 0.012 inches. The cable used will be from about 0.25 to about 0.5 inches in diameter and can be steel or other material of sufficient strength and flexibility. Any iron containing material will preferably be protected from rusting.

The tubes when completely inflated will be from about 0.25 to 2 feet in diameter, usually about 1.5 feet in diameter. The curtain should be at least 18 inches and preferably, at least about 20 inches when extended, usually not exceeding about 28 inches.

When the boom is to be set, the end of the boom may be attached by cable or other convenient means to a boat, buoy or other fixed object depending on the circumstances. As the boom is payed out, each section would be inflated. Assuming a 500 foot boom section, each tube would have 30 foot sections. Since the pinch seals closing the sections are staggered, there would be one valve every ten feet.

The sections are inflated with a blower which can operate against a back pressure of not more than about three inches of water. Thus, the sections are inflated to a pressure not greater than about 3 inches of water. This leaves the tubes fairly floppy and able to respond to a mild pressure at one point by partially collapsing, increasing the pressure in the remainder of the section.

Because of the mild pressure inside the tubes, the tubes will conform to the surface upon which they float. Thus, the two lower tubes will form the mirror image of the oil surface.

In accordance with the subject invention, new methods and apparatuses are provided for removal of immersible liquids from water and retaining such immersible liquids in a confined area. The vessels of the subject invention can be built in a variety of sizes to fulfill various requirements. The vessels provide a convenient and expeditious way for rapidly separating oil and water, even where substantial waves are encountered. The construction is such as to minimize turbulence in the introduction of the water and oil, by confining the oil and water and allowing the water to fall in a natural flow. Swash plates are provided to maintain a smooth flow of the oil and regulate the rate of flow of oil through the flume in relationship to the flow of water through the flume, so as to enhance capture of the oil in the oil layer.

In addition, the vessel can be used in a static condition, by employing pumps to withdraw the water and exhaust the water about water level. Therefore the vessel can be used for separating oil and water in both dynamic and static conditions.

The inflatable booms are of cheap construction and can be used under static conditions or where the surface is undulating. The tubes can be rapidly and easily inflated and payed out and deflated, retrieved and rolled on a spool. In case of puncture, only a small area will be affected with oil release minimized.

Although the foregoing invention has been described in some detail by way of illustration and example for purposes of clarity of understanding, it will be obvious that certain changes and modifications may be practiced within the scope of the invention, as limited only by the scope of the appended claims.

What is claimed is:

1. An oil skimming and separating vessel for collecting oil from the surface of a body of water, said vessel comprising:
   a hull having an opening in the bow of said vessel;
   a cylindrical separating tank vertically arranged within said vessel;
   elevator means for vertically raising and lowering said tank whereby a substantial portion of said tank may be located beneath the bottom of the hull of said vessel;

inlet opening means located in a sidewall of said tank, in an upper portion of said sidewall;

a channel for fluid flow with a second open end located at said opening in the bow of said vessel and a first open end in communication with said tank inlet opening means, when a substantial portion of said tank is located beneath the bottom of the hull of said vessel;

a buoyant, flexible, fluid collecting trough, having a first open end of said trough connected to said second open end of said channel and a second open end of said trough projecting forwardly of the bow of said vessel;

a vertical baffle plate within said separating tank with an upper edge spaced beneath the top of said tank and a lower edge spaced above the bottom of said tank, said baffle plate dividing said tank into first and second compartments;

a flume like conduit connecting said inlet opening means in the sidewall of said tank with the lower portion of said second compartment within said tank;

outlet opening means in said tank below said second compartment and communicating with said first compartment within said tank for the removal of water from said tank; and pump means in communication with the upper portion of said tank or the removal of collected liquid from the upper portion of said tank.

2. A vessel according to claim 1, wherein means are provided for vertically raising and lowering the second open end of said trough.

3. A vessel according to claim 1, including hoist means extending forward of said bow comprising two pairs of booms, each pair having an upper boom and a lower boom pivotally connected to a transverse beam mounted on said hull, said upper booms being joined by a cross arm adjacent their forward ends;

lines extending from said cross arm to said lower booms in slideable engagement with said trough; and means for raising and lowering the two pairs of booms.

4. A vessel according to claim 1, wherein said outlet opening means comprises apertures rearwardly and sidewardly of said tank.

5. A vessel according to claim 1, wherein a buoyantly supported horizontally arranged flat plate is located in the upper portion of said tank, whereby said plate may float on the surface of liquid within said tank to stabilize the surface thereof.

6. A vessel according to claim 1, wherein said trough is articulated and fabricated at least in part from a buoyant material.

* * * * *